(12) United States Patent
Jamison et al.

(10) Patent No.: US 9,091,347 B2
(45) Date of Patent: Jul. 28, 2015

(54) SAFETY CAP

(75) Inventors: Dale Eugene Jamison, Humble, TX (US); Kenneth Heidt Matthews, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 693 days.

(21) Appl. No.: 13/358,693

(22) Filed: Jan. 26, 2012

(65) Prior Publication Data

US 2013/0193142 A1    Aug. 1, 2013

(51) Int. Cl.
*A47J 27/08*    (2006.01)
*F16J 13/08*    (2006.01)
*F16J 13/24*    (2006.01)

(52) U.S. Cl.
CPC . *F16J 13/08* (2013.01); *F16J 13/24* (2013.01)

(58) Field of Classification Search
CPC .............................. A47J 27/0815; F16J 13/08
USPC ............... 220/203.1, 203.22, 203.09, 203.19, 220/323; 215/260, 315, 311, 307
See application file for complete search history.

(56) References Cited

U.S. PATENT DOCUMENTS

| | | | |
|---|---|---|---|
| 3,539,212 A | | 11/1970 | Poltorak |
| 3,667,649 A | * | 6/1972 | Thillet .......................... 220/323 |
| 4,467,936 A | * | 8/1984 | Makhijani ..................... 220/246 |
| 5,148,938 A | * | 9/1992 | Morgan, Jr. ................... 220/316 |
| 5,176,276 A | * | 1/1993 | Ballu ............................. 220/240 |
| D347,799 S | | 6/1994 | Dunham et al. |
| 5,520,300 A | | 5/1996 | Griffin |
| 2007/0228043 A1 | * | 10/2007 | Perruccio ...................... 220/323 |
| 2011/0011788 A1 | | 1/2011 | Bradshaw et al. |

FOREIGN PATENT DOCUMENTS

| | | |
|---|---|---|
| DE | 623561 C | 12/1935 |
| DE | 3707601 A1 | 9/1988 |

OTHER PUBLICATIONS

International Search Report and Written Opinion for PCT/US2013/021365 dated Feb. 21, 2014.

* cited by examiner

*Primary Examiner* — Steven A. Reynolds
*Assistant Examiner* — King M Chu
(74) *Attorney, Agent, or Firm* — McDermott Will & Emery LLP; Anthony Iannitelli

(57) ABSTRACT

A cell cap including a base, a top, a connector, one or more wings between the base and the top, and a lock. The top may engage the base and be moveable relative to the base. The connector may be moveable relative to only one of the base and the top. Each wing may have a first portion engaging the connector and a second portion engaging the cell. When pressure within the cell exceeds pressure outside the cell, the lock may lie in a first position, preventing relative movement between the base and the top. When pressure within the cell does not exceed pressure outside the cell, the lock may lie in a second position, allowing relative movement between the base and the top to cause the connector to move the first portion of the wing, thereby causing the second portion of the wing to move.

10 Claims, 5 Drawing Sheets

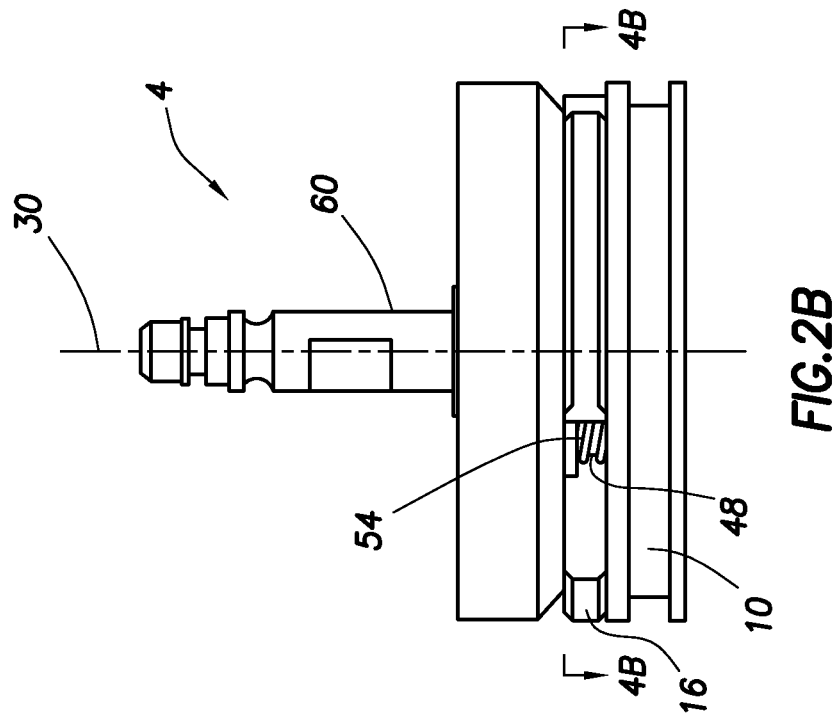
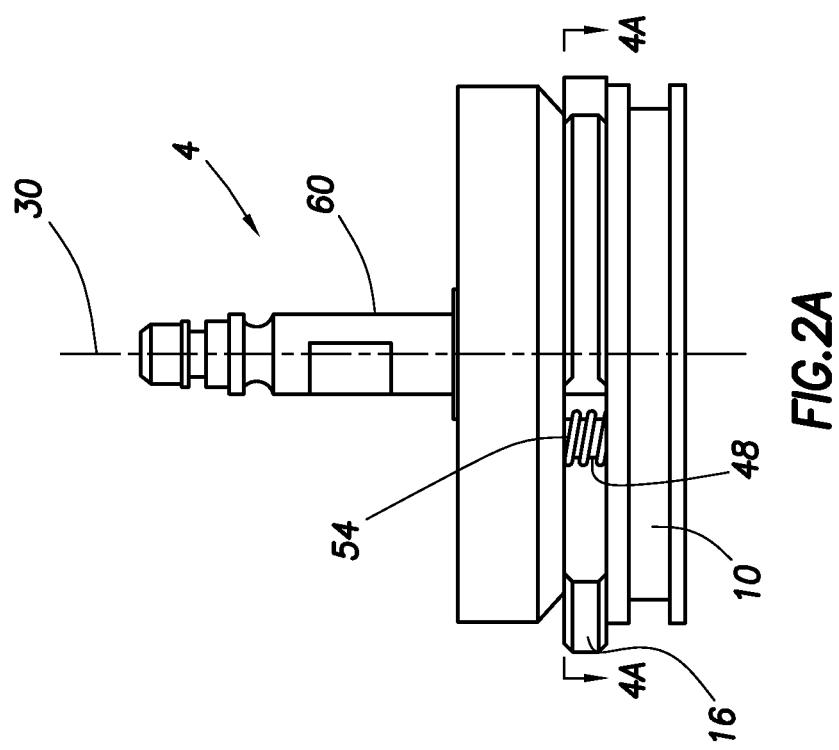

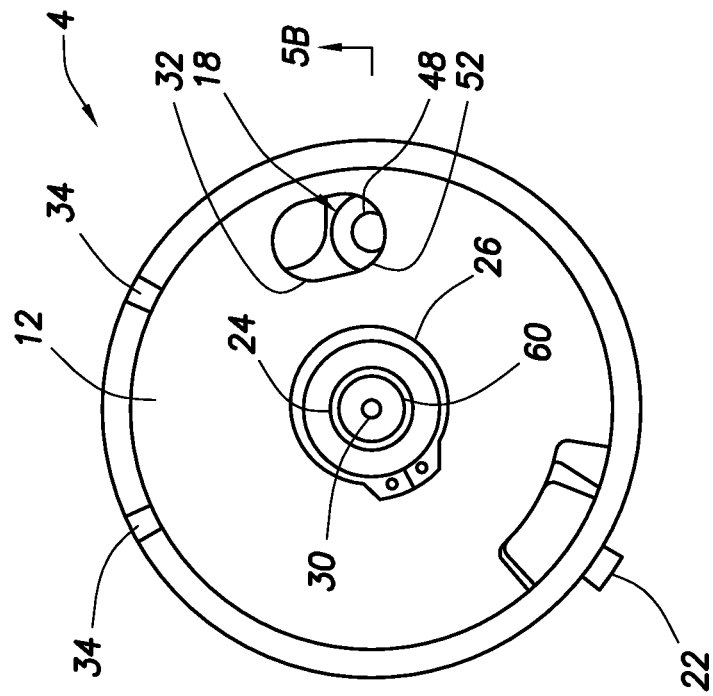
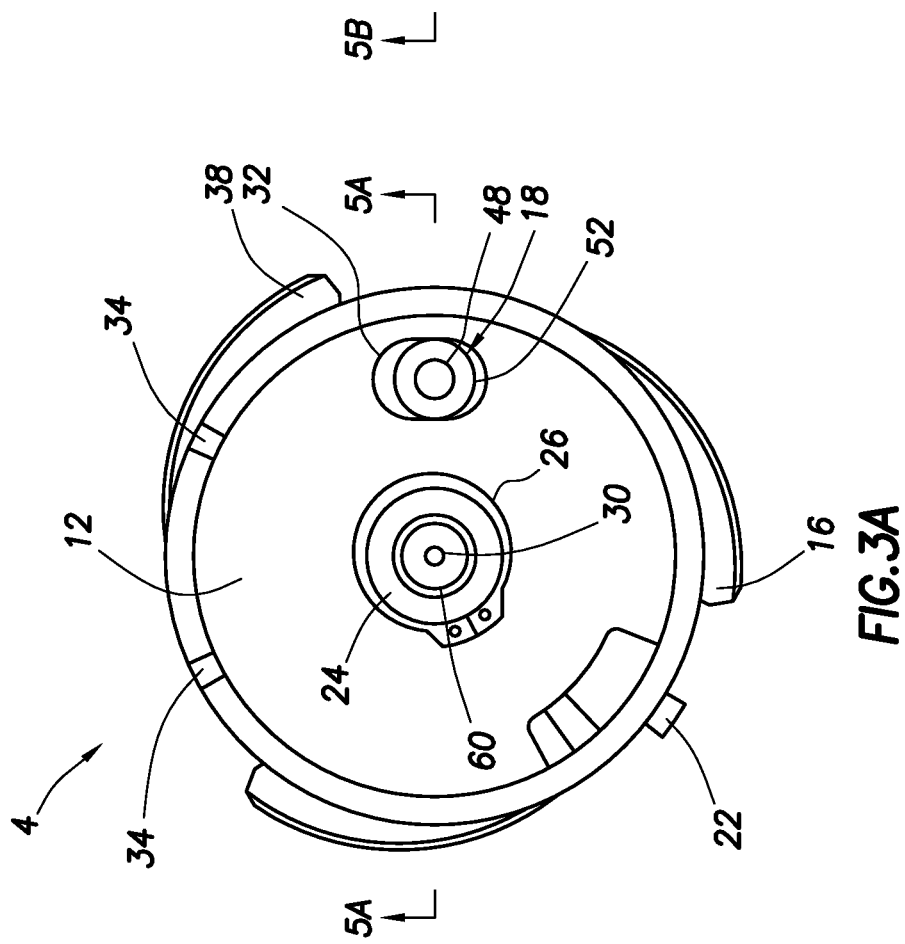

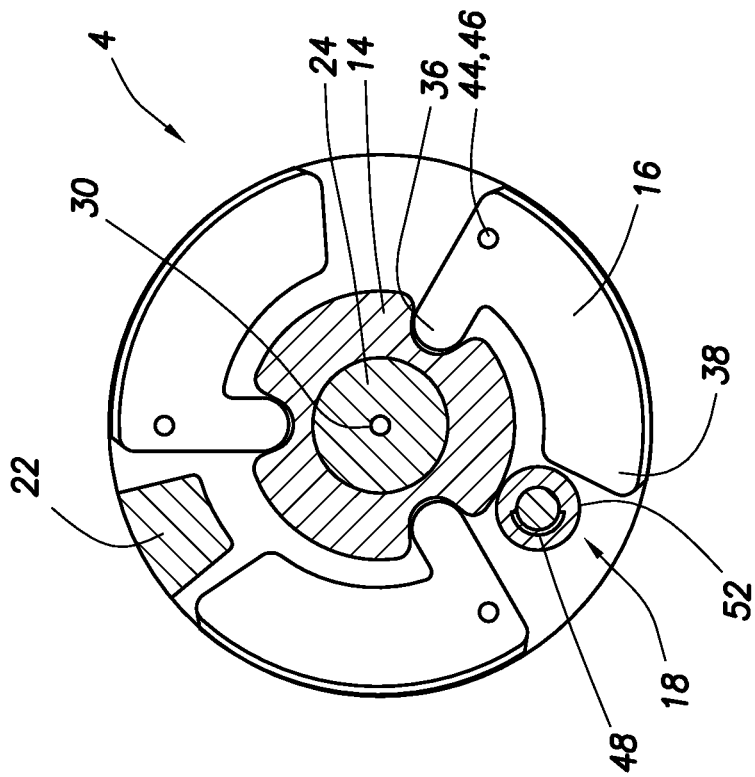
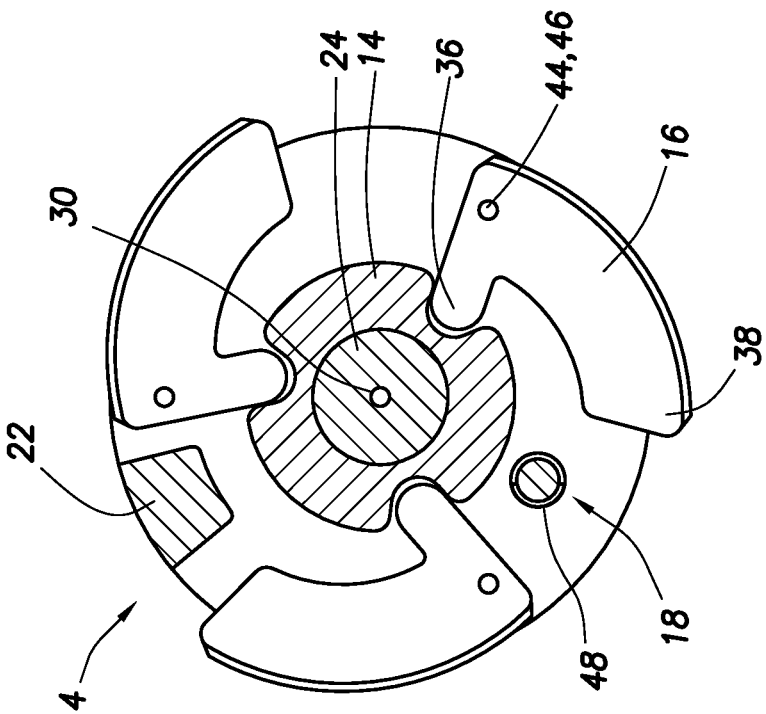

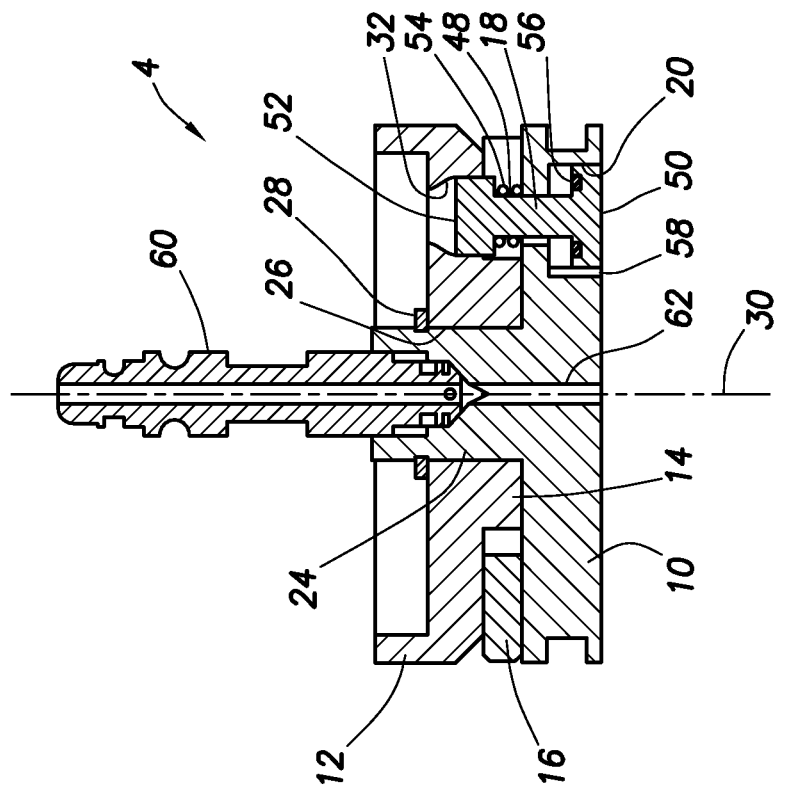
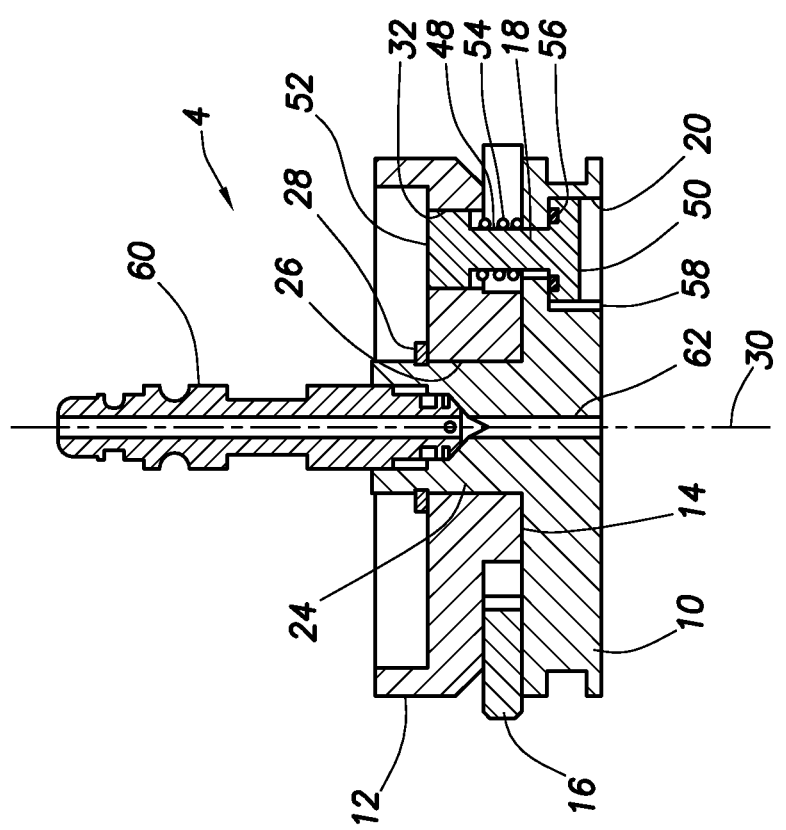

SAFETY CAP

BACKGROUND

The present disclosure is directed to a safety cap for a pressure cell, and more specifically to a pressure cap that can release pressure and prevent opening of the cap when pressure is present.

High-pressure, high-temperature filter presses are used for testing the filtration properties of drilling fluids, cement slurries, and fracturing fluids. One type of conventional cap used with a cell is secured in place via grub screws that pass through the cell and into detents formed in the cap. These screws may be disengaged while pressure within the cell is high. If one or more screws is disengaged while the cell is pressurized, the cap may be launched, creating a danger to the user and potentially undermining functionality of the cell. Devices, such as the CellTell™ Positive Pressure Indicator provide a visual indication for pressurized cells. However, they do not prevent the user from unscrewing the cap while under pressure.

SUMMARY

The present disclosure is directed to a safety cap for a pressure cell, and more specifically to a pressure cap that can release pressure and prevent opening of the cap when pressure is present.

In some embodiments, a cap for a cell includes a base, a top, a connector between the base and the top, one or more wings between the base and the top, and a lock. The top may engage the base and be moveable relative to the base. The connector may be moveable relative to only one of the base and the top. Each wing may have a first portion engaging the connector, and a second portion configured to engage the cell. When pressure within the cell exceeds pressure outside the cell, the lock may lie in a first position, preventing relative movement between the base and the top. When pressure within the cell does not exceed pressure outside the cell, the lock may lie in a second position, allowing relative movement between the base and the top. Relative movement between the base and the top may cause the connector to move the first portion of the wing, thereby causing the second portion of the wing to move.

In other embodiments, a method for closing a cell may include providing a cap, placing a portion of the cap into the cell, and moving a top of the cap, relative to a base of the cap, causing a wing of the cap to move, until the wing engages the cell. The cap may include the top, the base, a connector between the base and the top, the wing, and a lock. The top may be engaging the base and moveable relative to the base. The connector may be moveable relative to only one of the base and the top. One or more wings may be between the base and the top, with each wing having a first portion engaging the connector, and a second portion configured to engage the cell. When pressure within the cell exceeds pressure outside the cell, the lock may lie in a first position, preventing relative movement between the base and the top. When pressure within the cell does not exceed pressure outside the cell, the lock may lie in a second position, allowing relative movement between the base and the top. In this embodiment the lock is always engaged when the wings are extended regardless of pressure. By depressing the lock any pressure differential in the cell and outside is equalized as a safety feature. If the pressure is high enough one would have a very difficult time depressing the lock; however, the lock is not the primary way to vent the cell, but a secondary venting method. Relative movement between the base and the top may cause the connector to move the first portion of the wing, thereby causing the second portion of the wing to move.

In still other embodiments, a method for opening a cell may include providing a cap in engagement with the cell, depressing a button of a lock of the cell thereby moving the lock from the first position to the second position, moving a top of the cell relative to a base of the cell causing a wing of the cell to move until the wing disengages the cell, and removing the cap from the cell. The cap may include the base, the top, a connector, the wing, and the lock. The top may engage the base and be moveable relative to the base. The connector may be between the base and the top and moveable relative to only one of the base and the top. The wing may include one or more wings between the base and the top, each wing having a first portion engaging the connector, and a second portion configured to engage the cell. When pressure within the cell exceeds pressure outside the cell, the lock may lie in a first position, preventing relative movement between the base and the top. When pressure within the cell does not exceed pressure outside the cell, the lock may lie in a second position, allowing relative movement between the base and the top. Relative movement between the base and the top may cause the connector to move the first portion of the wing, thereby causing the second portion of the wing to move.

The features and advantages of the present disclosure will be readily apparent to those skilled in the art upon a reading of the description of the preferred embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modification, alteration, and equivalents in form and function, as will occur to those skilled in the art and having the benefit of this disclosure.

FIG. 2A is a side view of a cap, with wings extended, in accordance with one embodiment of the present disclosure.

FIG. 2B is a side view of the cap of FIG. 2A, with wings contracted, in accordance with one embodiment of the present disclosure.

FIG. 3A is a top view of the cap of FIG. 2A, with wings extended, in accordance with one embodiment of the present disclosure.

FIG. 3B is a top view of the cap of FIG. 2A, with wings contracted, in accordance with one embodiment of the present disclosure.

FIG. 4A is a cross-sectional top view of the cap of FIG. 2A, taken along line A-A of FIG. 2A, with wings extended, in accordance with one embodiment of the present disclosure.

FIG. 4B is a cross-sectional top view of the cap of FIG. 2A, taken along line B-B of FIG. 2B, with wings contracted, in accordance with one embodiment of the present disclosure.

FIG. 5A is a cross-sectional side view of the cap of FIG. 2A, taken along line C-C of FIG. 3A, with wings extended, in accordance with one embodiment of the present disclosure.

FIG. 5B is a cross-sectional side view of the cap of FIG. 2A, taken along line D-D of FIG. 3B, with wings contracted, in accordance with one embodiment of the present disclosure.

DETAILED DESCRIPTION

Figure 1:
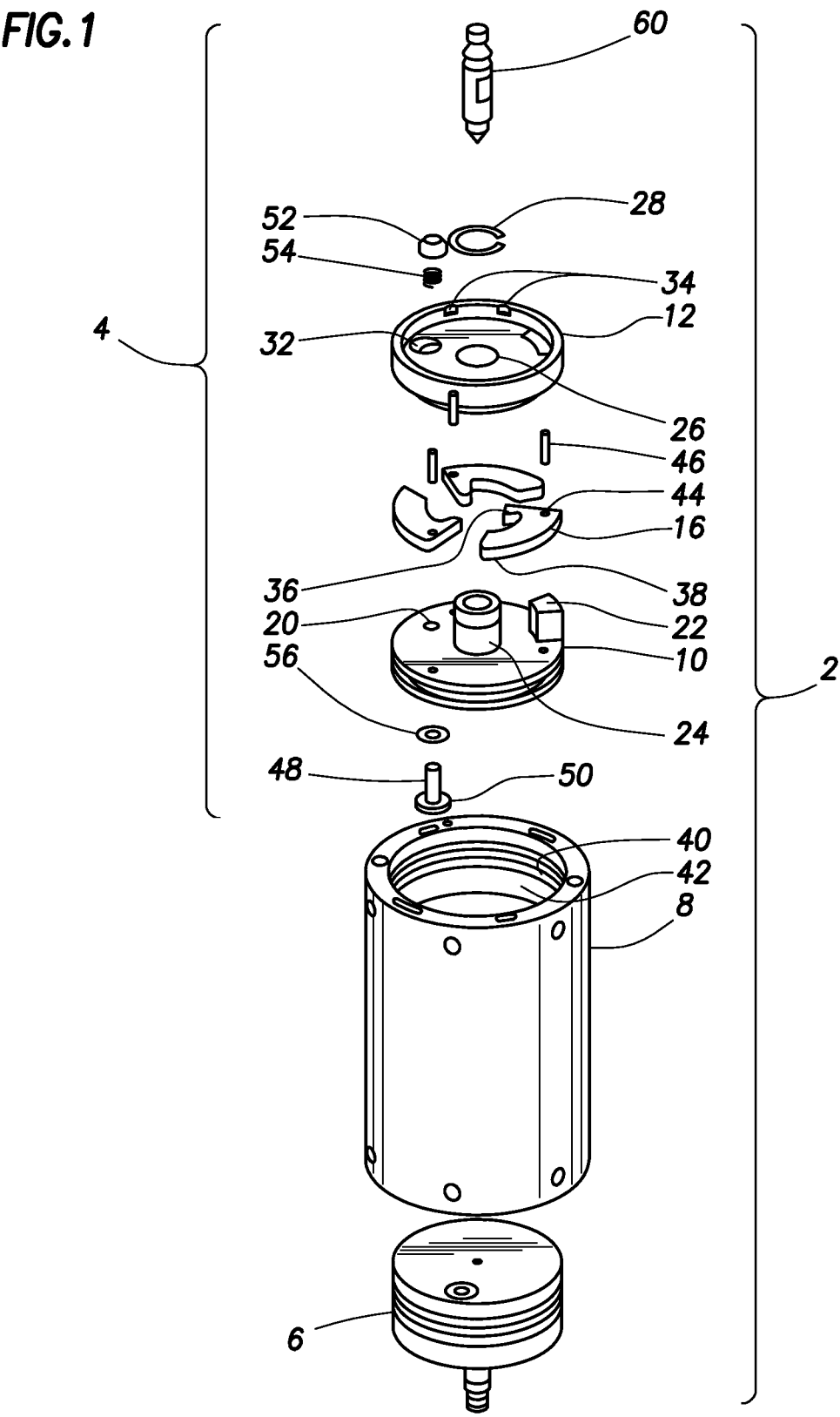
FIG. 1 is an exploded view of a filter press apparatus, in accordance with one embodiment of the present disclosure.

The present disclosure is directed to a safety cap for a pressure cell, and more specifically to a pressure cap that can release pressure and prevent opening of the cap when pressure is present.

According to some embodiments of the present disclosure, a cap may have a physical lock to prevent a cell from being opened under pressure. The cap may also have a mechanism for releasing pressure. Thus, the cap may form a combination pressure relief and locking device that cannot be opened until the pressure within the cell has been released. The disclosed design may prevent a user from releasing the cap from the cell while the cell is pressurized. Mechanically actuated wings are rotated into a radial groove in the cell during assembly. A spring-loaded lock engages the wing deployment mechanism during assembly. When the cell is pressurized, the user must press the safety lock down against the cell pressure to depress the lock and disengage the locking wings.

Referring now to the Figures, and FIG. 1 in particular, a high-temperature, high-pressure filter press or other sealed apparatus 2 may have a cap 4 and a bottom assembly 6 for closing a cell 8. The cap 4 may include a base 10, a top 12, a connector 14 (illustrated in FIGS. 4A, 4B, 5A, and 5B) between the base 10 and the top 12, one or more wings 16 between the base 10 and the top 12, and a lock 18 (illustrated in FIGS. 5A and 5B). The base 10 may include a substantially planar, substantially circular plate configured to seal the cell 8. Additional features may include a groove configured to engage other components, such as o-rings or other elements used to provide a seal between the base 10 and the cell 8. Other shapes can also be used for the base 10, so long as the base 10 has a profile to provide a sealing surface with the cell 8 and can hold pressure and/or temperature. The base 10 is configured to engage the top 12, such that relative movement between the base 10 and the top 12 causes the cap 4 to engage the cell 8. The base 10 may have an opening 20 shaped and sized to accommodate at least a portion of the lock 18. As illustrated, the opening 20 has a variable cross-section for different parts of the lock 18. The base 10 may have an indexing element 22 (e.g., pin) to provide alignment and/or leverage for moving the top 12 relative to the base.

The top 12 engages the base 10 and is moveable relative to the base 10. This engagement may occur via a projecting portion 24 of the base 10. The projecting portion 24 may extend upward through a corresponding opening 26 in the top 12, and be secured by a retaining ring 28. Thus, the top 12 and the base 10 may be moveable relative to one another. For example, the illustrated arrangement may allow for the relative movement between the base 10 and the top 12 to include rotational movement between the top 12 and the base 10, about an axis 30 (illustrated in FIGS. 2A to 5B) passing through a center point of each of the top 12 and the base 10, while preventing separation of the top 12 and the base 10. The top 12 may have an opening 32 shaped and sized to accommodate at least a portion of the lock 18. As illustrated, the opening 32 is circular, however other shapes for the opening 32 may be selected for various designs of the apparatus 2. The top 12 may have one or more tool notches 34 to provide leverage for moving the top 12 relative to the base 10. The spring always moves the lock to the locked position when the cell wings are extended, regardless of pressure. The user must press the locking mechanism down to open the cell regardless of pressure. However pressing the button down depressurizes the cell as well as disengaging the lock. The spring always pushes the locking part up, even if no pressure is being exerted within the cell. However, when under pressure the lock assembly is very difficult to press down without first using valve (60) to vent the device which then allows with the button to be more easily depressed to unlock the cell. This provides added safety to ensure that pressure is vented when the wings are to be retracted to an open position.

Referring to FIGS. 4A and 4B, illustrated are cross-sectional views of the cap 4 and the connector 14 taken along lines 4A-4A and lines 4B-4B in FIGS. 2A and 2B, respectively. The connector 14 may be generally arranged between the opposing axial surfaces of the base 10 and the top 12 and moveable relative to one or the other. In at least one embodiment, as illustrated, the connector 14 forms an integral portion of the top 12 and may extend axially from the top 12 toward the base 10. In other embodiments, the connector 14 may be coupled to the top 12 using mechanical fasteners, welding techniques, adhesives, combinations thereof, or the like. Consequently, the connector 14 as depicted is moveable relative to the base 10 during operation.

The illustrated connector 14 may have a gear-shaped profile having a female configuration with at least three detents, notches, or grooves to engage a first portion 36 of a corresponding plurality of wings 16. Each wing 16 may define corresponding male profiles configured to interact with the female profiles of the connector 14. Alternatively, the connector 14 may be formed integrally with the base 10, may have any number of notches to engage any number of wings 16, and/or may have a male configuration corresponding to a female first portion 36 of wings 16.

In alternative embodiments, the connector 14 could be formed integrally with the base 10, such that the connector 14 is moveable relative to the top 12. In such embodiments, the disposition of the wings 16, as will be described below, may also have to be modified for proper operation. In yet other embodiments, the connector 14 may be formed separate from both the base 10 and the top 12, but may have a profile so as to prevent movement between the connector 14 and one of the base 10 and the top 12.

One or more wings 16 may lie between the base 10 and the top 12. As illustrated, the cap 4 includes three wings 16. However, other numbers and configurations of wings may be used, depending on design considerations of various apparatus 2. For example, the cap 4 may include one, at least two, at least three, at least four, at least five, or more than five wings 16. Each wing 16 may have the first portion 36 engaging the connector 14, and a second portion 38 configured to engage the cell 8. The first portion 36 may engage the connector 14 via a cam-like male projection, as illustrated. Alternatively, the first portion 36 of the wing 16 may have another profile, such as a female first portion 36 configured to engage a corresponding female-shaped connector 14.

Referring again to FIG. 1, with continued reference to FIGS. 4A and 4B, the second portion 38 may engage the cell 8 by engaging a groove 40 formed in an inner wall 42 of the cell 8. In order to align with and engage the groove 40 firmly, the second portion 38 of the wing 16 may have a chamfered, slanted, or tapered shape and/or the groove 40 may have an angled cross-section. Thus, when the second portion 38 of the wing 16 engages the groove 40 of the cell 8, a face seal may be present. In one or more embodiments, the second portion 38 of the wing 16 may have a curved shape to provide for a better load-bearing surface, or may have another suitable shape for the designed load. The wing 16 may include a point of rotation, or fulcrum 44 (FIGS. 4A and 4B) between the first portion 36 and the second portion 38. The fulcrum 44 may be substantially parallel to the axis 30 and may include a pin 46 or other connection allowing for the wing 16 to be attached to the cap 4, while allowing rotational movement of the wing 16. The pin 46 may pass through the wing 16 at the fulcrum 44 and may extend into the base 10 and/or the top 12. The pin 46 at the fulcrum 44 may allow for relative motion between the base 10 and the top 12 to provide movement of the second portion 38 of the wing 16 inward and outward, or toward and away from the axis 30.

Relative rotational movement between the base 10 and the top 12 may cause the connector 14 to engage and move the first portion 36 of the wing 16, thereby causing the second portion 38 of the wing 16 to move. In operation, rotation of the base 10 about the axis 30 relative to the top 12 causes the connector 14 to rotate relative to the base 10. As the connector 14 rotates, it causes the first portion 36 of the wing 16 to move. Thus, movement of the connector 14 caused by relative movement between the base 10 and the top 12 may cause the first portion 36 of the wing 16 to pivot about the fulcrum 44 in a first direction which, in turn, also causes the second portion 38 of the wing 16 to pivot about the fulcrum 44 in the first direction. Depending on the direction of rotation of the base 10 relative to the top 12, the second portion 38 of the wing 16 may either be biased outward from the axis 30 or biased inward toward the axis 30. Thus, rotational movement in the first direction causes the wing 16 to engage the cell 8, and rotational movement in a second, opposite direction causes the wing 16 to disengage the cell 8. As a result, the wing 16 may be moved into and out of engagement with the cell 8 by relative rotation between the base 10 and the top 12.

Referring now to FIGS. 5A and 5B, illustrated are cross-sectional views of the cap 4 and the lock 18 as taken along lines 5A-5A and lines 5B-5B in FIGS. 3A and 3B, respectively. In operation, the lock 18 may be configured to prevent relative movement between the base 10 and the top 12 when pressure within the cell 8 exceeds pressure outside the cell 8. The lock 18 may be further configured to allow relative movement between the base 10 and the top 12 when pressure within the cell 8 does not exceed pressure outside the cell 8. The lock 18 has a first, locked position when the pressure within the cell 8 exceeds pressure outside the cell 8 and a second, unlocked position when the pressure within the cell 8 does not exceed the pressure outside the cell 8.

The lock 18 may include a bar 48, a plunger 50, and a button 52. The bar 48 may extend through the opening 20 in the base 10. The plunger 50 may lie at a base end of the bar 48, and the button 52 may lie at a top end of the bar 48. As illustrated, the plunger 50 may also extend at least partially into the opening 20 in the base 10. In some embodiments, the lock 18 may include a spring 54 arranged between the button 52 and the base 10. The spring 54 may be configured to bias or otherwise maintain the lock 18 in a locked position. Additionally, the lock 18 may include an o-ring 56 adapted to provide a seal between the plunger 50 and the base 10, and thereby preventing the passage of fluids through the opening 20 of the base 10 when the lock 18 is in the locked position. Thus, when pressure inside the cell 8 exceeds pressure outside the cell 8, that pressure acts on the plunger 50 and urges the lock 18 into a first, upward and locked position. In this position, the plunger 50 seals the opening 20 in the base 10 and effectively prevents the passage of fluid therethrough. In the upward and locked position, the button 52 extends into the opening 32 of the top. When the button 52 is depressed with sufficient force to overcome any pressure differential between the interior and exterior of the cell 8, including any bias provided by the spring 54, the lock 18 may be moved to a second, downward and unlocked position. In the downward position, the button 52 does not extend into the opening 32 of the top 12, and the top 12 is thus free to move relative to the base 10, as the button 52 of the lock 18 is not preventing such movement.

A port 58 (illustrated in FIGS. 5A and 5B) may be defined in the base 10 to allow the passage of fluid(s) therethrough when the lock 18 is in the second, unlocked position. The port 58 may be arranged between the base 10 and at least a portion of the lock 18, such that depression of the button 52 allows fluid to pass from within the cell 8 to the environment. In the first, locked position, the port 58 may be covered by the plunger 50 or other portion of the lock 18, thereby preventing the escape of fluid. Thus, depression of the button 52 may allow for a full release of pressure from the cell 8, or may allow for a partial release of pressure from the cell 8 (e.g., when pressure has been partially released prior to depression of the button 52). When pressure inside the cell 8 exceeds pressure outside the cell 8, the lock 18 may be moved to the unlocked position by exerting sufficient pressure on the button 52 to cause the pressure on the lock 18 to exceed the pressure inside the cell 8, including any bias from the optional spring 54. Pressure may then flow from within the cell 8 via the port 58, thereby causing equalization of pressure between the inside of the cell 8 and the outside of the cell 8.

Referring again to FIG. 1, the cell 8 may be a cylindrical element, open at both ends, with the inner wall 42 having the groove 40 defined therein. The groove 40 may be configured to engage the wing(s) 16 and prevent movement of the cap 4, when the cap 4 is locked in position in the cell 8. Alternatively, the cell 8 may be a more conventional cell, with screw holes instead of a groove 40. Such a conventional cell may optionally be modified by adding a groove for more effective engagement with the cap 4.

The bottom assembly 6 may include a cap similar to that described above, or may include other elements suitable for effectively sealing the apparatus 2 when combined with the cap 4 and the cell 8. In one or more embodiments, the bottom assembly 6 and the cell 8 may be integrally formed as a single monolith structure, such that the cap 4 and the cell 8, which includes the bottom assembly 6, form an enclosed or sealed apparatus 2.

A method for closing the cell 8 of the apparatus 2 may include providing the cap 4 as described above, placing at least a portion of the cap 4 into the cell 8, and moving the top 12 relative to the base 10, thereby causing the wing 16 to move or otherwise pivot until the wing 16 engages the cell 8. The wing 16 may engage the cell 8 at the groove 40 described above, or may otherwise move outward into contact with the inner wall 42 of the cell. Moving the top 12 relative to the base 10 may involve rotating the top 12 relative to the base 10 about the axis 30 passing through both the base 10 and the top 12, as described above. Moving the top 12 relative to the base 10 may cause the first portion 36 of the wing 16 to rotate or pivot about the fulcrum 44 in a first direction, which in turn, may cause the second portion 38 of the wing 16 to also rotate or pivot about the fulcrum 44.

The method for closing the cell 8 may further include ensuring that the lock 18 is in a first, locked position. Ensuring that the lock 18 is in the locked position may involve inspecting the button 52 to determine that the button 52 is extended into the opening 32 in the top 12, and/or attempting to turn the top 12 relative to the base 10 to ensure that the lock 18 prevents such movement. At any time during the process, the bottom assembly 6 may be attached to the cell 8, such that the bottom assembly 6, the cell 8, and the cap 4 form the apparatus 2.

A method for opening the cell 8 of the apparatus 2 may include providing the cap 4, as described above, in engagement with the cell 8. The button 52 of the lock 18 may be depressed, thereby moving the lock 18 from the first, locked position, to the second, unlocked position. Depression of the button 52 may release pressure from within the cell 8. In other embodiments, however, pressure may be released from the cell 8 prior to depressing the button 52 by removing or manipulating a valve 60 that may be connected to or otherwise extending axially from the cap 4. When pressure is released via the stem 60 through a channel 62 defined in the base 10 and different from the opening 20 in the base 10, additional pressure may be released via depressing button 52, which may cause further pressure to escape from within the cell 8.

Once the button 52 has been depressed and pressure has equalized between the interior and exterior of the cell 8, the top 12 may then be moved, relative to the base 10, thereby causing the wing 16 to move until disengaging from the cell 8. The cap 4 may then be removed from the cell 8. The movement of the top 12 relative to the base 10 may include rotating the top 12 relative to the base 10 about the axis 30 passing through both the base 10 and the top 12. Moving the top 12, relative to the base 10, may cause the first portion 36 of the wing 16 to rotate about the fulcrum 44 in a first direction, which in turn, causes the second portion 38 of the wing 16 to also rotate about the fulcrum 44.

The method for opening the cell 8 may further include ensuring that the lock 18 is in the second, unlocked position prior to moving the top 12 relative to the base 10. Ensuring that the lock 18 is in the unlocked position may involve depressing the button 52 or inspecting the button 52 to determine that the button 52 is moved out of engagement with the opening 32 in the top 12, and/or attempting to turn the top 12 relative to the base 10 to ensure that the lock 18 permits such movement.

Materials suitable for assembly 2, including cap 4 include metals, such as grade 304 or 316 stainless steel, or other materials suitable for use with a high-temperature, high-pressure filter press or other sealed apparatus.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A cap for a cell, comprising:
    a base;
    a top engaging the base and moveable relative to the base;
    a connector arranged between the base and the top and moveable relative to one of the base and the top;
    one or more wings movably disposed between the base and the top, each wing having a first portion engaging the connector and a second portion engageable with the cell, wherein the one or more wings comprise a fulcrum between the first portion and the second portion; and
    a lock lying in a first position when pressure within the cell exceeds pressure outside the cell to prevent relative movement between the base and the top, and lying in a second position when pressure within the cell does not exceed pressure outside the cell to allow relative movement between the base and the top,
    wherein relative movement between the base and the top causes the connector to move the first portion of each wing, thereby causing the second portion of each wing to move, and wherein relative movement between the base and the top causes the first portion of the one or more wings to rotate about the fulcrum in a first direction, which, in turn, causes the second portion of the wing to also rotate about the fulcrum.

2. The cap of claim 1, wherein the relative movement between the base and the top comprises rotational movement about an axis passing through both the base and the top.

3. The cap of claim 2, wherein rotational movement of the one or more wings in a first direction causes the one or more wings to engage the cell, and rotational movement in an opposite direction causes the one or more wings to disengage the cell.

4. The cap of claim 1, further comprising a pin that passes through the one or more wings at the fulcrum, the pin being configured to extend into the base and the top.

5. The cap of claim 1,
    wherein the lock comprises a bar extending through an opening defined in the base, a plunger disposed adjacent a base end of the bar, and a button disposed adjacent a top end of the bar;
    wherein the first position of the lock is an upward position, whereby the button extends into an opening of the top; and
    wherein the second position of the lock is a downward position where the button does not extend into the opening of the top and the one or more wings are able to disengage the cell.

6. The cap of claim 1, wherein the one or more wings comprise at least three wings.

7. The cap of claim 1, comprising a port defined between the base and the lock, the port being configured to provide fluid communication when the lock is in the second position.

8. The cap of claim 1, wherein the connector is formed integrally with the top and extends axially therefrom such that the connector is moveable relative to only the base.

9. The cap of claim 1, wherein the connector extends axially from the base toward the top and is moveable relative to the top.

10. The cap of claim 1, further comprising a valve coupled to an extending axially from the cap.

* * * * *